A. T. NELSON.
ADJUSTABLE MULTIPLE SPINDLE HEAD FOR DRILL PRESSES.
APPLICATION FILED NOV. 21, 1912.
1,083,696.
Patented Jan. 6, 1914.
2 SHEETS—SHEET 2.
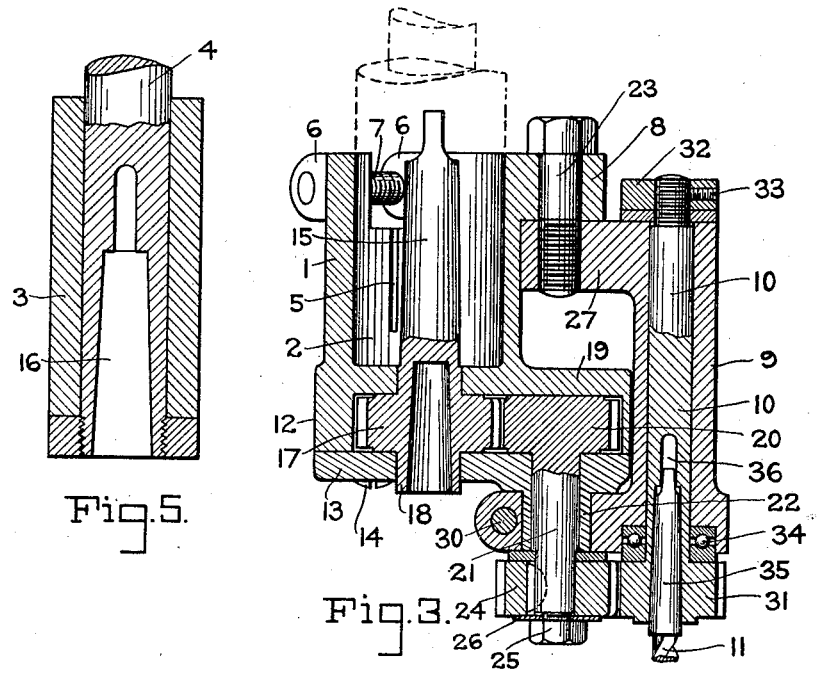
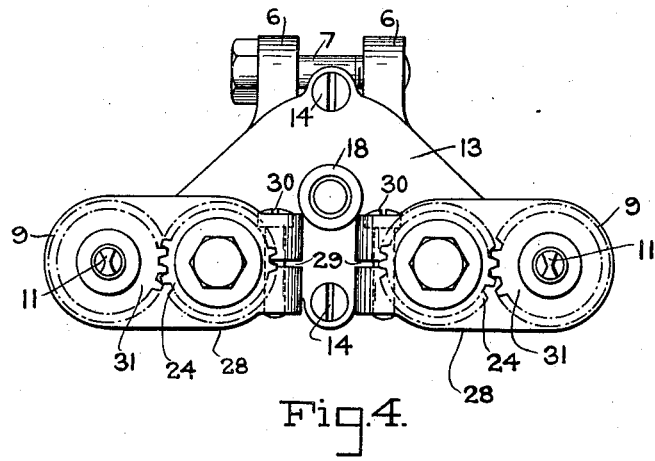
WITNESSES:
Albert A. Hofmann
N. E. Beausamle
INVENTOR
Arne T. Nelson.
BY
E. S. Wheeler
ATTORNEY

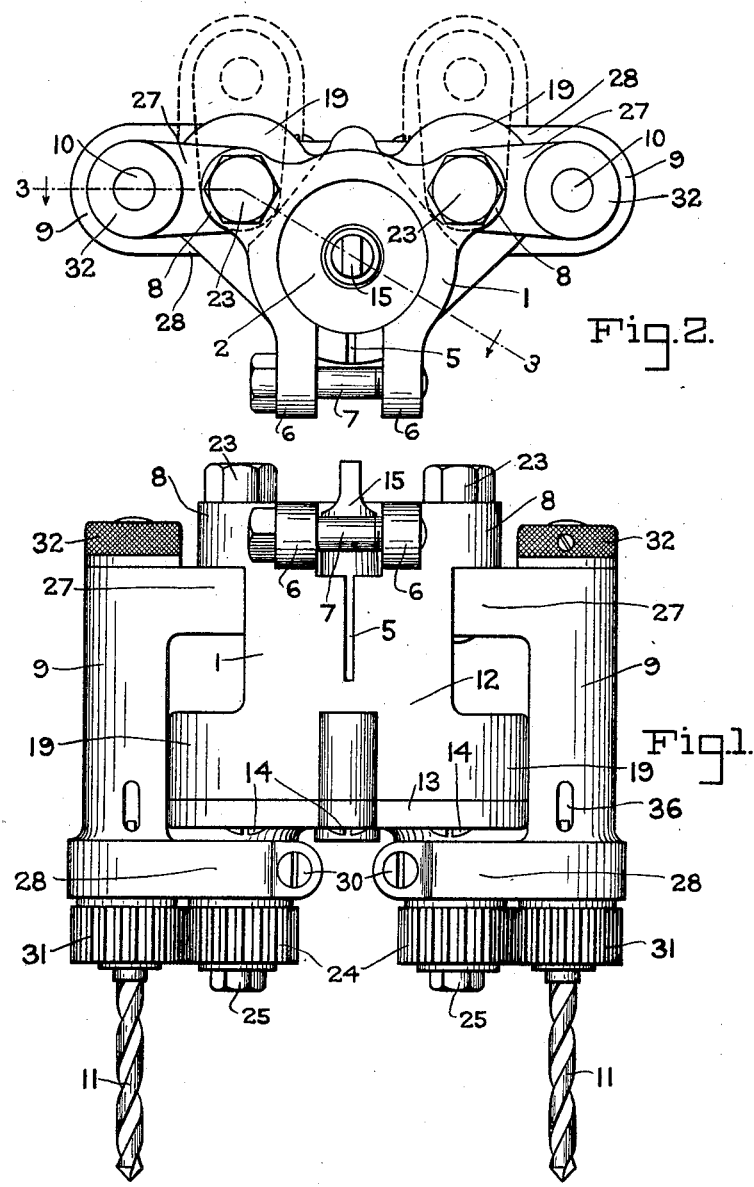

UNITED STATES PATENT OFFICE.

ARNE T. NELSON, OF DETROIT, MICHIGAN.

ADJUSTABLE MULTIPLE-SPINDLE HEAD FOR DRILL-PRESSES.

1,083,696. Specification of Letters Patent. Patented Jan. 6, 1914.

Application filed November 21, 1912. Serial No. 732,619.

*To all whom it may concern:*

Be it known that I, ARNE T. NELSON, a citizen of the United States, residing at Detroit, in the county of Wayne, State of Michigan, have invented certain new and useful Improvements in Adjustable Multiple-Spindle Heads for Drill-Presses; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to an adjustable multiple spindle head for drill presses, adapted for use in connection with any single spindle drilling machine, and consists in the construction and arrangement of parts hereinafter more fully set forth and pointed out particularly in the claims.

The object of the invention is to provide simple and efficient means for rendering adjustable the drill spindles in a multiple spindle head, whereby two apertures may be simultaneously drilled in a piece of work at a given distance between centers, provision being made for affording a wide range of adjustment for quickly and accurately adjusting the parts, and for locking them after adjustment.

The above object is attained by the mechanism illustrated in the accompanying drawings, in which:

Figure 1 is an elevation of a multiple spindle head involving my invention. Fig. 2 is a top plan view of Fig. 1. Fig. 3 is a vertical section as on line 3—3 of Fig. 2. Fig. 4 is an inverted plan view of the spindle head with the parts in the position shown in Fig. 1. Fig. 5 is a fragmentary view in section through the lower end of a spindle sleeve of a drill press and a drill spindle therein, in connection with which this invention is employed, as hereinafter explained.

Referring to the drawings by the characters of reference marked thereon, 1 designates a socket member having therein a socket 2, as shown in Fig. 3, for the reception of the spindle sleeve 3 of a drill press carrying the usual drill spindle 4, as shown in Fig. 5. The wall of the socket member is slotted, as shown at 5 in Fig. 3, to enable said member to be contracted, and extending from the wall of said member on each side of the slot 5 are the ears 6, through which passes a clamping bolt 7 for the purpose of contracting the socket member upon the spindle sleeve 3 of a drill press so as to cause the spindle head of which the socket member is a part to move vertically with the spindle sleeve of the drill press, as will be well understood in the art. Projecting laterally from the upper end of the socket member 1, at an angle of about thirty degrees with respect to a perpendicular, are the lugs 8 which form portions of the hinge connections between the socket member of the spindle head and the swinging yokes 9 which carry the spindles 10 of the drills 11, as will be hereinafter more fully set forth. At the lower end of the socket member 1 is a gear housing 12, the bottom of which is closed by a plate 13 detachably held in place by the screws 14. Projecting from the housing 12 into the socket 2 is a tapered arbor 15 adapted to enter the tapered chuck 16 at the lower end of the drill press spindle 4 and effect a driving fit therein to cause a rotation of the arbor 15 as said drill press spindle revolves. At the lower end of the arbor 15, within the housing 12, is the main driving gear 17. A hub portion of the gear 17 depends through the bottom plate 13 of the housing 12, as shown at 18, to assist in affording a bearing for the arbor 15.

Within the extensions 19 of the housing 12 are mounted the gears 20, of which there are two, and which mesh with the gear 17 to receive motion therefrom. Each of the gears 20 is provided with a short vertical shaft 21 which depends through a sleeve 22 extending downwardly from the other side of the bottom plate 13. The sleeves 22 are disposed in axial alinement with the apertures through the lugs 8 that receive the pivot bolts 23. Upon the lower end of each of the shafts 21 is secured a gear 24 held in place by a nut 25 screwed thereon and engaging a washer 26 which supports said gears, as clearly shown in Fig. 3.

At the upper end of each of the yokes 9 is an inwardly extending right-angle portion 27 which lies under the corresponding lug 8 on the socket member 1, and is provided with a tapped aperture to receive the threaded end of the bolt 23. At the lower end of each of the yokes 9 is a lateral extension 28 which is apertured to receive the sleeve 22 depending from the other side of the bottom plate 13, so as to effect in conjunction with the bolt 23 a hinge joint between said yoke and the case of the drill head. This arrangement enables the yokes 9 to be swung in the arc of a circle concentric with the axis of their respective shafts 21 and pivot bolts 23. The wall of each of the lateral extensions 28 of the yokes is slotted as shown at 29, and passing through the slotted portion of each of said extensions is a clamping screw 30 whereby the extensions 28 of the yokes may be clamped tightly to the sleeves 22 when desired.

Each of the yokes 9 is provided with a vertical aperture therethrough in which is rotatably seated a drill spindle 10 at the lower end of which is a gear 31 which meshes with the corresponding gear 24 on the shaft 21. Each of said drill spindles 10 is held in its swinging yoke 9 by means of a nut 32 threaded on the upper end thereof and adapted to be locked after adjustment by a set screw 33 extending through said nut. Each of the spindles 31 is provided with a thrust bearing 34 at its lower end. In the lower end of each of the drill spindles 10 is a tapered chuck adapted to receive the tapered shank 35 of the drill 11. Communicating with the chuck in each of the drill spindles is a transverse opening 36 enabling a wedge to be introduced for the purpose of moving the drill when desired.

By the arrangement herein shown and described the yokes 9 carrying the drill spindles 10 may each be swung in the arc of a circle concentric with the axis of its pivot bolt 23 and pivot sleeve 22 to carry the drills close together as shown by dotted lines in Fig. 2, or to extend them to the position shown in Figs. 1 and 4 and by solid lines in Fig. 2, thereby enabling two holes to be simultaneously drilled in a piece of work at any desired distance between centers within the range of adjustment of the drill spindles. When the hinged yokes carrying the drill spindles shall have been properly adjusted they may be securely locked at both ends by tightening the bolts 23 and the clamping screws 30. As the drill spindles are swung in the operation of swinging the yokes 9, the spindles are caused to travel in an arc concentric with the axis of the gears 24, thereby keeping the spindle gears 31 always in mesh with said gears 24.

As the adjustment may be quickly effected this device greatly facilitates the operation of drilling two holes in a single piece of work, especially where said holes must be drilled a given distance between centers.

It will be understood that in practice the spindle head will be placed upon a drill press with the socket member 1 clamped to the spindle sleeve 3, and the tapered arbor 15 within the socket 16 in the drill press spindle 4, whereby, as the drill press spindle revolves, said arbor will be turned to rotate the gear 17 and impart a rotating movement to the meshing gear 20. The rotation of the gears 20 will turn their shafts 21 and impart movement to the gears 24, which, being in mesh with the gears 31 of the drill spindles 10, will cause said spindles to revolve and turn the drills simultaneously in the same direction.

Having thus fully set forth my invention, what I claim as new, and desire to secure by Letters Patent, is:—

1. An adjustable spindle head for drill presses comprising an arbor for connection with the spindle of a drill press, a primary gear thereon, a secondary gear meshing with the primary gear, a housing for the primary and secondary gears, a shaft extending from the secondary gear, a sleeve on the housing embracing said shaft, a yoke pivoted at its upper end concentric with the axis of the secondary gear, a part on said yoke at its lower end pivotally embracing said sleeve, a drill spindle journaled in said yoke, and a driving connection between the shaft of the secondary gear and said spindle.

2. In an adjustable multiple spindle head for drill presses, an arbor adapted for engagement with a drill press spindle, a primary gear thereon, two secondary gears meshing with the primary gear and disposed at an acute angle to a right line through the axis of said primary gear equi-distant from said secondary gears, a shaft depending from each of said secondary gears, two swinging yokes pivoted to the spindle head concentric to the axis of the shafts of the secondary gears respectively, a drill spindle in each of said yokes, a driving connection between said shafts and said drill spindles respectively, which permits said yokes to swing in the arc of a circle and maintain said driving connection, and means for locking in position each of said yokes at any point of adjustment.

In testimony whereof, I sign this specification in the presence of two witnesses.

ARNE T. NELSON.

Witnesses:
E. S. WHEELER,
M. E. BROESAMLE.

---

Copies of this patent may be obtained for five cents each, by addressing the "Commissioner of Patents, Washington, D. C."